United States Patent [19]
Eaton

[11] 4,423,993
[45] Jan. 3, 1984

[54] RETRACTABLE BAR STOCK FEEDER

[75] Inventor: Brian M. Eaton, Elmira, N.Y.

[73] Assignee: Hardinge Brothers, Inc., Elmira, N.Y.

[21] Appl. No.: 313,808

[22] Filed: Oct. 22, 1981

[51] Int. Cl.³ ............................................. B23B 13/00
[52] U.S. Cl. ........................................ 414/17; 91/447
[58] Field of Search ...................... 91/447; 414/14–17; 92/130 B; 406/109

[56] References Cited

U.S. PATENT DOCUMENTS

| | | | |
|---|---|---|---|
| 2,300,457 | 11/1942 | Mariotte | 414/17 |
| 2,327,916 | 8/1943 | Mariotte | 414/17 |
| 2,577,203 | 12/1951 | Mariotte | 414/17 |
| 2,892,243 | 6/1959 | Lanphere et al. | 414/17 |
| 3,419,160 | 12/1968 | Azuma | 414/15 |
| 3,861,830 | 1/1975 | Johnson | 406/109 X |
| 3,924,494 | 12/1975 | Azuma | 414/15 X |
| 4,168,864 | 9/1979 | Weeks | 406/109 X |

*Primary Examiner*—Joseph E. Valenza
*Assistant Examiner*—Terrance L. Siemens
*Attorney, Agent, or Firm*—Shlesinger, Arkwright, Garvey & Fado

[57] ABSTRACT

A bar stock feeder has a pneumatic circuit with positive feed and vacuum circuits and uses an air pump to provide vacuum from a pressure line, and is entirely mounted within a single base pedestal to present a readily operable control panel.

10 Claims, 5 Drawing Figures

RETRACTABLE BAR STOCK FEEDER

BACKGROUND OF INVENTION

This invention relates to bar stock feeders for machine tools, and particularly to bar stock feeding units which automatically feed the bar stock to the machine tool and are also retractable therefrom.

This type of pneumatic feed and retractable unit is generally shown in the Mariotte U.S. Pat. No. 2,327,916 and Mariotte U.S. Pat. No. 2,577,203 as well as in the patent to Lanphere 2,892,243. The units shown provide for both pneumatic feed and retraction of a bar stock feed plunger assembly. They employ a vacuum line for retracting the plunger assembly from the extended position.

These units have drawbacks, either with respect to the required equipment or the requirement for vacuum devices which are cumbersome. The use of plural lines and controls made it cumbersome to operate the unit, and also difficult to service.

SUMMARY AND FEATURES OF THE INVENTION

Accordingly, it is a principal feature of this invention to provide an improved pneumatic bar feeder unit having both the feed and retraction capability.

It is another feature of this invention to provide a simplified pneumatic circuit which will provide for both feed and retraction of the bar feed plunger.

It is a still further feature of this invention to provide an improved pressure source operated pressure and vacuum control circuit for a bar stock feeder which is readily usable by an operator.

It is another feature of this invention to provide an easily usable single movement type of control for a retractable bar stock feeder.

A still further feature of this invention is to provide the operator with a control panel free of obstruction and readily usable to regulate pressure setting and to control feed and retraction of the bar stock plunger.

It is a still further feature of this invention to provide for a base mounted unit in which the circuit pressure lines and the components are associated and mounted within a readily accessible internal cabinet disposed in the base.

These and further features of this invention will become apparent from the following description of the drawings.

DESCRIPTION OF THE INVENTION

Figure 1:
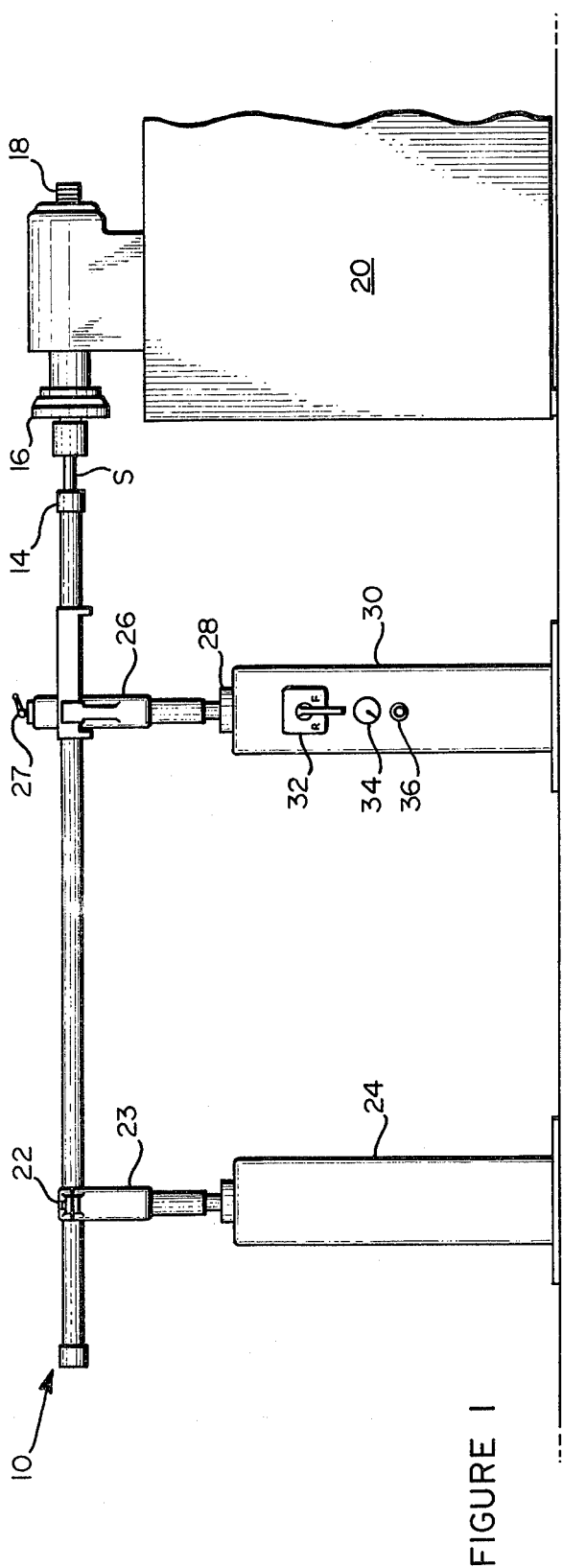
FIG. 1 is a side view of the bar stock feeder of the subject invention in position behind a machine tool.

Referring to FIG. 1, the bar stock feeder generally indicated at 10 is horizontally positioned in alignment with the rear of the machine tool. It has a rear end cap 12 and a front end cap 14. The bar stock plunger extends into the rear spindle 16 of the machine tool and up to the rear of collet 18 mounted on machine tool base pedestal 20. A rear cylindrical tube feeder clamp 22 has a lower vertically adjustable and positionable support standard assembly 23 on which the cylindrical feeder assembly is clamped. The base pedestal 24 is mounted on the floor or a metal support plate, and is usually bolted in fixed position. Forward standard assembly 26 which carries the valve seat assembly 27 has vertical adjusting collar 28 which is mounted on the top of the base pedestal cabinet 30. Feed control valve handle 32, pressure gauge face 34, and regulator knob 36 are mounted on the front panel 31 (see also FIG. 4) of the cabinet 30 which faces the machine tool operator.

Figure 2:
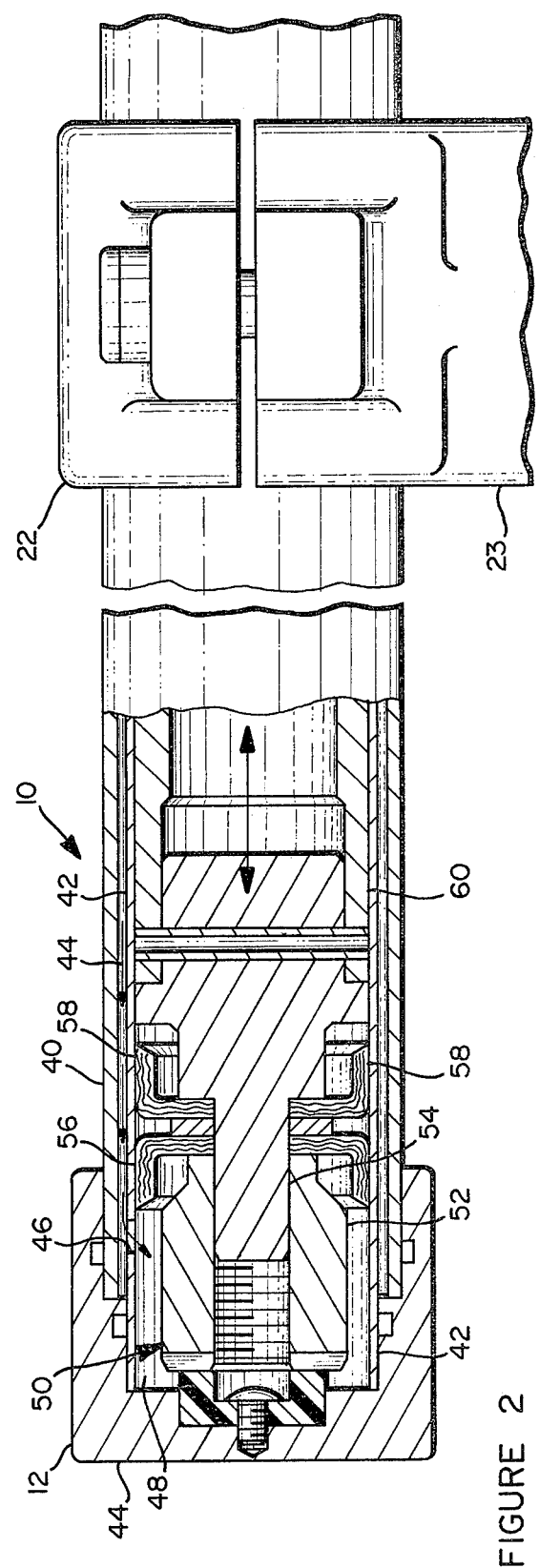
FIG. 2 is a partial sectional view of the rear of the bar stock assembly of FIG. 1.

FIG. 2 shows the details of construction and the air flow arrangement within the rear of the feeder tube assembly 10 adjacent the rear end cap 12. The outer cylindrical feed tube 40 of the tube assembly is of slightly larger internal diameter than the internal cylindrical tube 42 and provides an internal pressure path generally indicated by the arrows 44 which passes through the opening 46 in inner tube 42 and down into the internal chamber 48 immediately behind the plunger assembly 50. The plunger assembly 50 has a rear thread nut 52 mounted on the threaded piece 54 which holds the seal cups 56 and 58 in position at the rear of the assembly and in tight sealing engagement with the internal surface of the inner feed tube 42. The plunger body rear section 60 is shown immediately in front of the sealing cups 56 and 58.

Figure 3:
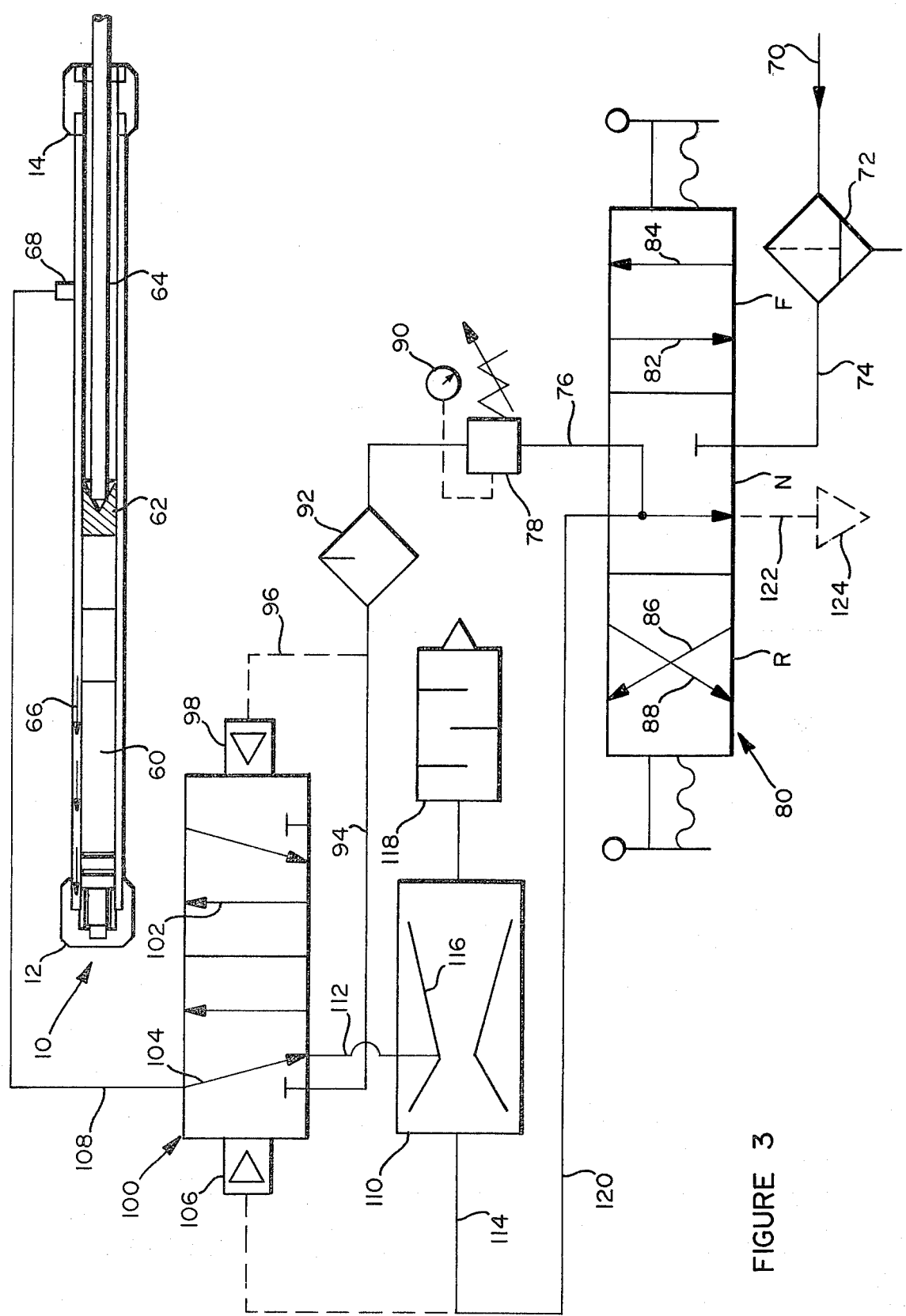
FIG. 3 is a schematic diagram of the bar stock feeder pneumatic circuit illustrating the arrangement used to control feed and retraction.

The pneumatic circuit for the unit is shown in FIG. 3. The bar stock feeder assembly generally indicated at 10 shows the plunger assembly rear section 60 immediately behind the forward bar stock receiving section 62. It has a conical stock receiving forward surface which receives the bar stock piece 64 to be fed to the machine tool.

The pneumatic path between the inner and outer tube is generally indicated by the arrows 66. The pneumatic supply valve 68 includes the manual rotatable locking valve assembly 27 shown in FIGS. 1 and 4, through which the air pressure or vacuum is conducted from the pneumatic supply circuit.

The pneumatic supply source is connected to lubricator 72 through input pneumatic pressure line 70. It then passes through input line 74 to the three-way control valve 80. The control valve 80 passes pneumatic pressure therethrough to the line 76 and then to the regulator 78. The three-way control valve 80 has a positive feed section F with two one-way conduits 82 and 84. When the control valve handle 32 is shifted into the feed position, the conduit 84 of the valve positive control section F is aligned with the conduits 74 and 76 thereby bringing positive pressure to the lines 76. The regulator knob 36 (FIGS. 1 and 4) controls selection of the pressure value to be applied to the bar feeder tube assembly. The pressure value is shown by the gauge face 34 of gauge 90. The lubricator 92 is connected between regulator 78 and the high pressure input line 94 of the master four-way control valve 100. A branch input line 96 is connected between input line 94 and pilot control valve 98 which controls the shifting of the master four-way control valve 100.

The master control valve 100 has a control section generally indicated on the right with a pass through conduit 102 which when positioned connects the line 108 to the valve seat 68 which is part of the front carrier assembly. The pneumatic pressure passes therethrough and between the outer and inner tube of the bar feeder tube assembly along path 66 to the rear of the plunger assembly. This pressure is supplied to the rear of the plunger assembly to force it forward and to carry the stock toward the collet of the machine tool.

The four-way control valve 100 provides the pneumatic power for both feed and for the vacuum retraction of the plunger assembly. In the position shown for this valve in FIG. 3, the left control section is connected in circuit to provide for a vacuum supply to the plunger tube assembly. In this instance, the line 108 is connected directly with the internal passage 104 of the left control section of the valve. It is connected to the vacuum motor unit 110 by connecting line 112.

The vacuum pump unit 110 is operated by the supply of air pressure along line 114. The air passes through the internal nozzle configuration 116 of the vacuum pump and is exhausted through the muffler 118. The vacuum pump unit creates a vacuum along line 112 which is transmitted through valve conduit 104 to line 108 and to the bar stock feeder assembly. The pilot valve 106 operates to move the left section into the position desired by application of pressure from a secondary line connected to line 120, which in this instance would be a high pressure line.

The application of high pressure air to this line is controlled by the valve 80 when it is manually shifted, so that the left control section with the crossed conduits are connected. Line 86 connects the high pressure incoming line 74 from the filter 72 to the line 120, while internal conduit 88 connects the former high pressure line 76 through line 122 to exhaust port 124.

Figure 5:
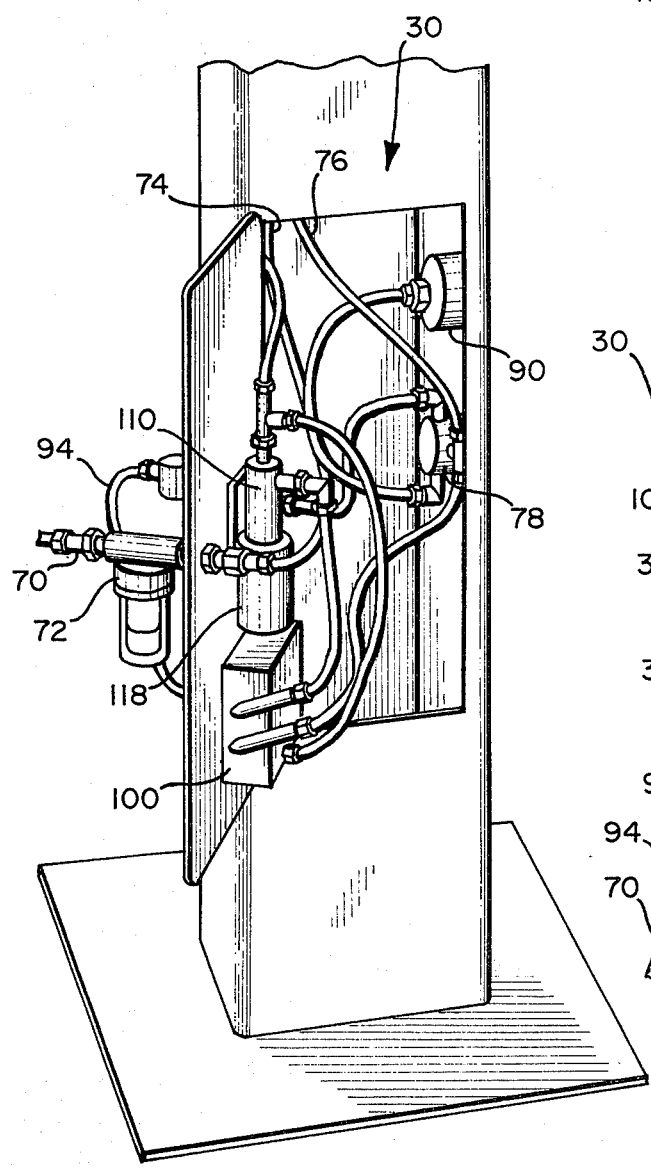
FIG. 5 is a partial view of the base of FIG. 4 showing the location of the elements of the pneumatic circuit within the base cabinet.
Figure 4:
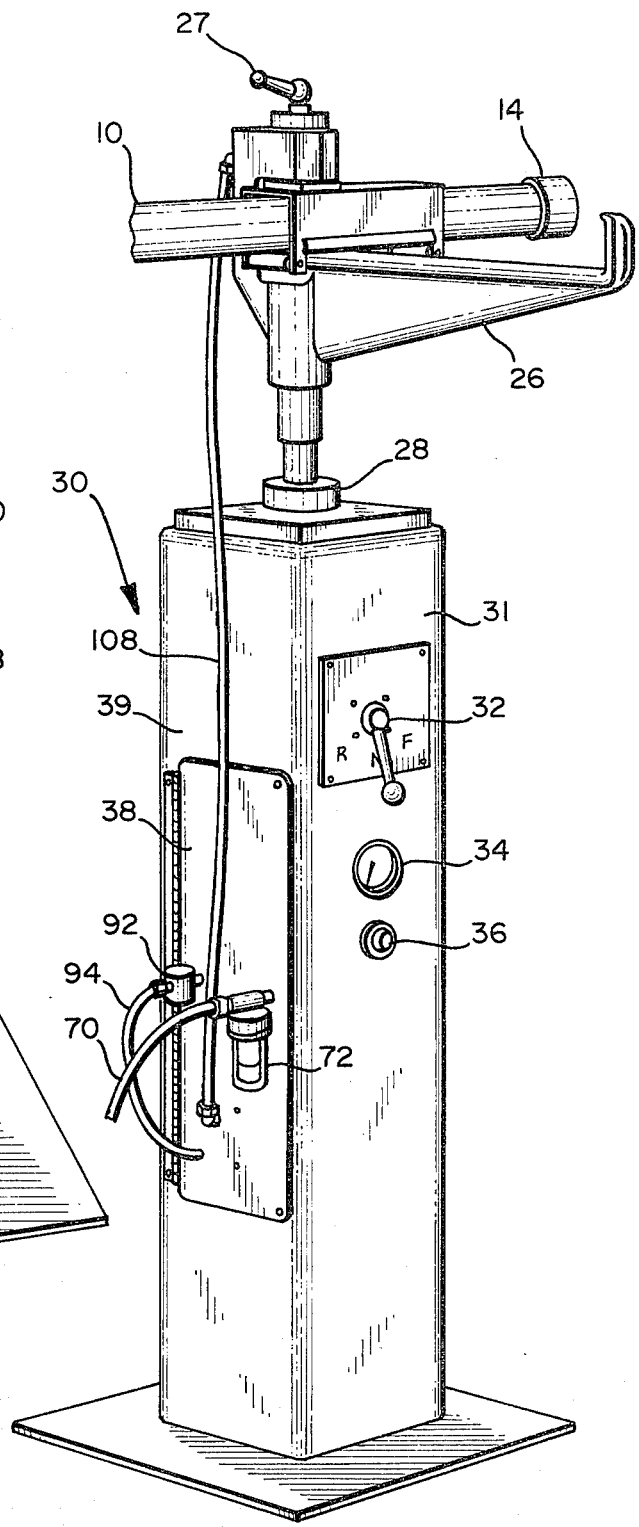
FIG. 4 is a perspective view of the bar stock feeder front carrier and the base illustrating the control and access panels.

The physical arrangement of the pneumatic circuit within the base pedestal of the bar stock feeder is shown in FIGS. 4 and 5. The forward pedestal member 30 provides support for the carrier member 26 on which the manually operable securing and pneumatic pressure supply valve 27 is mounted. It connects with a valve seat disposed on the outer of the two spaced concentric tubes 40 of the tube assembly 10 to provide an entranceway and pneumatic path to the space between the outer tube 40 and the inner tube 42. The construction of the valve assembly is shown in further detail in copending U.S. patent application Ser. No. 287,557, filed July 28, 1981 for Bar Stock Feeder. The supply valve 27 is designated in the schematic of FIG. 3 at 68. The construction of the rear portions of the tube and plunger assemblies is shown in section in FIG. 2.

The base 30 is a hollow cabinet having a front panel 31 with a control valve handle 32 extending therethrough to provide a ready and accessible means for the operator to either feed or retract the bar stock plunger assembly. Immediately below the handle is a pressure gauge face 34. A regulator knob 36 is disposed immediately below the pressure gauge and is adjustable to permit the operator to provide the required amount of pressure to feed the plunger assembly at the desired rate of advance.

A hinged access door 38 is provided on the side panel 39 for permitting ready service and checking of the pneumatic circuit. The filter 72 and the lubricator 92 of the pneumatic circuit previously described with respect to FIG. 3, are mounted on the access door 38. The supply of air is provided through air line 70 and the filter 72 to the pneumatic circuit disposed within the cabinet. Line 108 which supplies the positive pressure from the pneumatic circuit extends along the outside of the panel door upwardly to the carrier assembly rear portion 26 and is connected with the internal pneumatic path of the tube assembly through the conduit of the valve 27.

The arrangement of the pneumatic circuit within the pedestal 30 is shown in FIG. 5. When the access door 38 is opened the pressure gauge 90 and regulator 78, mounted on the inside of the forward panel 31, can readily be seen. Control valve 80 disposed above the opening and mounted on the front panel 31 immediately behind the control valve lever 32 is hidden from view.

The panel door 38 on the interior thereof has the four-way valve 100 mounted at the bottom inside of the panel door 38. At the central part of the inside of the panel door the pneumatically powered vacuum pump 110 is mounted with the muffler 118 disposed immediately below it. All of the interconnecting lines are disposed within the cabinet and are readily accessible for checking and repair. Merely swinging the door open exposes all of the circuit elements and there is ample room for an operator to service and to check the elements and the lines.

The lubricator 92 and the filter 72 are mounted on the outside of the door and are readily accessible for servicing and replacing of either fluid or filter elements. The control lines, as the component elements, are numbered to agree and correlate with the pneumatic lines of FIG. 3.

OPERATION

The bar stock feed of the plunger assembly and bar stock is controlled by the movement of the lever 32 to feed (F) position. The operator adjusts the knob 36 of the regulator to provide the desired pressure to advance the bar stock at the right feed rate. The gauge face 34 will give the pressure reading for the desired pressure. When the bar stock feeder assembly has been advanced to its closest forward position, and it is time to insert a new length of bar stock, the operator moves the handle to the neutral position, and then to the retract (R) position. When the plunger assembly has been withdrawn to clear the rear of the machine tool and to permit lateral movement without contact with the machine tool, the operator moves the valve handle 32 to the neutral (N) intermediate position which will exhaust pressure from the pressure supply lines used for either the feed or retract position.

The bar feed unit has no interfering pieces or lines around which the operator must reach. All of the necessary elements are mounted clear of the front face of the cabinet base 30, and all internal pneumatic circuit lines are disposed within the cabinet.

The pneumatic circuit has the advantage of using a single pneumatic supply line and an arrangement of circuit elements which are relatively small and compact permitting the entire pneumatic control circuit to be readily mounted within the cabinet base. The arrangement within the cabinet base allows for immediate inspection and easy service when panel door 38 is opened.

The vacuum pump unit and the muffler provide a compact and effective means for providing for vacuum retraction of the plunger assembly. The filter and the lubricator which are mounted on the outside of panel door 38 are disposed clear of the front control panel, but in a position which permits ready observation by the operator and allows rapid change of the filter element or supply of lubricant to the unit.

With this pneumatic circuit and its installation within the base of the bar stock feeder as described, the operator has finger-tip control of the bar feed with an economical circuit whose components make it possible to install the entire circuit and its control elements within the base, giving the operator the freedom of movement and control which is necessary for the safest operation and most expeditious operation of this unit.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A retractable bar stock feeder, comprising:
   (a) a cylindrical feeder tube assembly mounted on a carrier standard base and containing a retractable plunger assembly having an outer diameter slightly less than the inner diameter of the feeder tube assembly,
   (b) A pneumatic pressure path for receiving air pressure or vacuum and conveying it to the rear of the plunger assembly within and at the rear of the cylindrical feeder tube assembly,
   (c) a pneumatic pressure source,
   (d) selective valve means connected to the pressure source and having a first and a second pressure outlet line for selectively supplying pneumatic pressure to one or the other outlet lines,
   (e) automatic valve means having a pressure conduit with its inlet connected to the first pressure outlet line of the selective valve means, and its outlet connected to the pneumatic pressure path for supplying air pressure to the retractable plunger assembly when the bar stock is to be advanced,
   (f) positive pressure conversion means connectable with the second pressure outlet line of the selective valve means for receiving positive pressure and producing a vacuum at a vacuum port,
   (g) a vacuum connecting line connected between the vacuum port and a second conduit of the automatic valve means for applying a vacuum to the pneumatic path, and
   (h) control means connected to the automatic valve means for controlling its operation so as to apply either positive pressure or vacuum to the pneumatic path depending upon the position of the selective valve means.

2. The retractable bar stock feeder of claim 1, wherein:
   (a) the selective valve means is a three-way manual valve mounted on the carrier standard base.

3. The retractable bar stock feeder as set forth in claim 1, wherein:
   (a) the positive pressure conversion means is a venturi type air pump.

4. The retractable bar stock feeder as set forth in claim 3, wherein:
   (a) the means for controlling operation of the automatic valve means includes a pressure responsive valve which is connected to the selective valve means and which shifts the automatic valve means from one conduit to another.

5. The retractable bar stock feeder as set forth in claim 1, wherein:
   (a) the selective valve means is a three-way manual valve mounted on the carrier standard base,
   (b) the positive pressure conversion means is a venturi type air pump, and
   (c) the control means for controlling operation of the automatic valve means includes a pressure responsive pilot valve which shifts the automatic valve means from one conduit to another.

6. The retractable bar stock feeder as set forth in claim 1, wherein:
   (a) the pneumatic path includes an annular space in the cylindrical feeder tube assembly between two concentric slightly spaced tubes, the inner of such tubes having an opening therethrough adjacent the rear thereof, and
   (b) the pneumatic path also includes a valve seat assembly mounted on the outer of the two slightly spaced concentric tubes of the feeder tube assembly.

7. A retractable bar stock feeder, comprising:
   (a) a pair of spaced support pedestal bases on each of which a carrier standard is mounted, and which are in alignment with a machine tool,
   (b) a bar stock feeder tube assembly mounted on the carrier standards and having a pneumatically responsive retractable plunger for feeding stock to the machine tool,
   (c) the support base closest to the machine tool being a hollow cabinet with an access door and a front control panel,
   (d) pneumatic circuit means for supplying pressure and vacuum which is disposed within the cabinet and including a single handle multiple position control valve, the handle of which is mounted on the cabinet panel and is movable to a pressure and vacuum position,
   (e) a high pressure source connected to the pneumatic pressure circuit,
   (f) a pneumatic path within the feeder tube assembly and connected to the pneumatic pressure circuit through a manual retractable locking valve mounted on the carrier standard of the base closest to the machine tool to control movement of the feeder tube assembly plunger,
   (g) the pneumatic circuit means containing a high pressure circuit including the control valve for supplying high pressure air to the pneumatic path to advance the plunger unit,
   (h) the pneumatic circuit means also contains a vacuum circuit including as an element the control valve for supplying vacuum to the pneumatic path to retract the plunger, and
   (i) the control valve having one position where an internal conduit is connected with the vacuum circuit, and another position where another internal conduit is connected with the high pressure circuit.

8. The retractable bar stock feeder as set forth in claim 7, wherein:
   (a) the vacuum circuit includes a vacuum pump operable by pneumatic pressure to create a vacuum for the vacuum circuit, and (b) the high pressure source is connected through the control valve position associated with the vacuum circuit to activate the vacuum pump.

9. The retractable bar stock feeder as set forth in claim 7, wherein:
(a) the control valve has a neutral position which connects the high pressure lines of the high pressure and vacuum circuits to an exhaust outlet.

10. The retractable bar stock feeder as set forth in claim 7, wherein:
(a) the front control panel also includes a pressure control regulator knob and a pressure gauge face.

* * * * *